Figure 1:
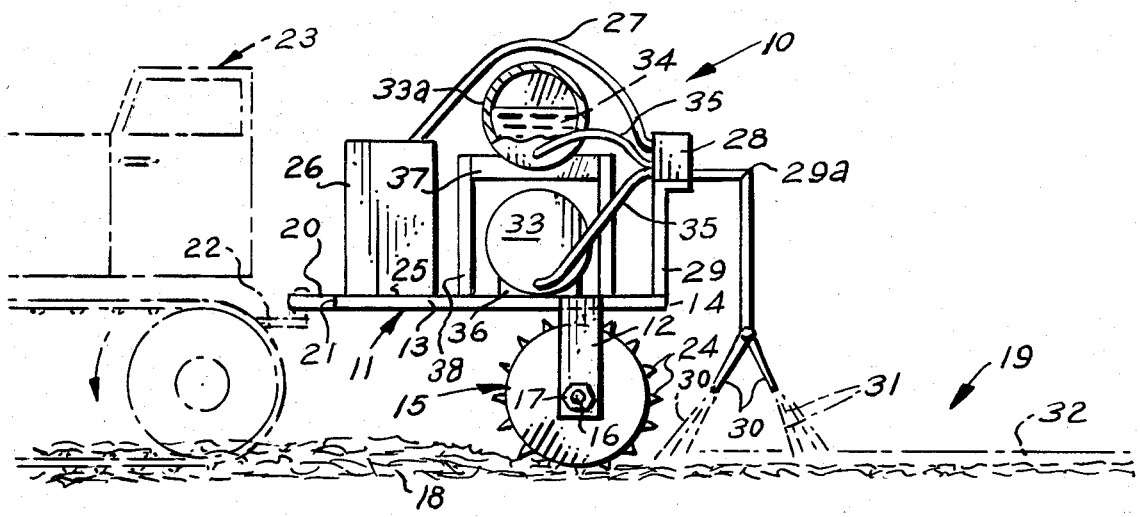

United States Patent [19]

Kramer et al.

[11] Patent Number: 4,519,338
[45] Date of Patent: May 28, 1985

[54] APPARATUS AND METHOD FOR APPLYING A FOAM LAYER TO COVER AND SEAL DUMPED WASTE

[75] Inventors: Fritz Kramer, Newport Beach, Calif.; Thomas E. Skornscheck, Brandon, Fla.; Ernest Strauss, Florence, S.C.

[73] Assignee: Sanifoam, Inc., Costa Mesa, Calif.

[21] Appl. No.: 543,933

[22] Filed: Oct. 20, 1983

[51] Int. Cl.³ .............................................. B05B 13/00
[52] U.S. Cl. .................................... 118/305; 427/136; 427/421; 239/172; 405/128; 405/129
[58] Field of Search ............... 118/305, 300; 427/136, 427/421; 405/128, 129; 239/172

[56] References Cited

U.S. PATENT DOCUMENTS

| | | | |
|---|---|---|---|
| 3,418,672 | 12/1968 | Regan | 118/305 X |
| 3,618,856 | 11/1971 | Sachnik | 239/77 |
| 4,037,664 | 7/1977 | Gibson | 239/172 X |
| 4,421,788 | 12/1983 | Kramer | 427/136 |

Primary Examiner—Shrive P. Beck
Attorney, Agent, or Firm—Auslander & Thomas

[57] ABSTRACT

An apparatus and method for covering and sealing dumped waste is provided wherein hardenable plastic foam is sprayed in a swath as waste is compacted by a roller. The roller is wider than the treads of the tractor vehicle, the spray nozzles are angulated alternately, spraying any projection. The configuration of the wheel and nozzles reduced gaps in the foam layer by a large factor over the prior art using less foam and labor and in less time.

10 Claims, 2 Drawing Figures

APPARATUS AND METHOD FOR APPLYING A FOAM LAYER TO COVER AND SEAL DUMPED WASTE

This invention relates to an improved apparatus and method for applying a foam layer to cover and seal dumped waste such as in a landfill of other dump area.

In the United States, municipal, state and/or federal regulations govern the operation of landfills or dumps which receive garbage deposits during the day. A common requirement for such regulations includes covering the day's deposit of garbage or waste with a layer of compacted earth approximately six inches deep, to prevent, among other things, the escape of odors and blowing paper, the proliferation of pests, such as flies, rodents and birds and the leaching of toxic or disagreeable components from the garbage.

In U.S. Pat. No. 4,421,788, issued Dec. 20, 1983 entitled Method and Apparatus for Coating a Substrate with Foamed Plastic, there is disclosed a means for providing a plastic foam spray to cover waste in a landfill. This application dealt with an improved solution to the task of placing and compacting the earth cover this represents a very significant fraction of the cost of operating a landfill employing, significant labor and heavy equipment.

Such compacted earth cover performs its principal function for only a day or so. That is, each day's layer of garbage is covered at the end of the day and a further layer of garbage with compacted earth topping is deposited on the following day.

Besides the cost of applying the compacted earth cover, it is recognized that multiple layers of earth fill used in this way tend to consume a significant volume of landfill which might otherwise be used for receiving garbage. As is well known, many areas are rapidly using up their available landfill acreage and any reduction in use rate of the landfill volume is desirable.

Various types of plastic foam have been in use for such applications as building insulation. Common types of plastic foam include, for example, foam made by the Isoschaum process described in U.S. Pat. No. 2,860,856 wherein a foaming mixture of a foaming agent solution and air is formed and, this mixture is then in turn, mixed with a liquid synthetic resin such as precondensate of urea and formaldehyde. The resulting foam is then cured by a curing accelerator for the resin such as, for example, oxalic or other acid, which is added to the foam just before it is expelled from the apparatus so that the foam tends to cure and harden very soon after it is deposited.

Typically an air pressure of between about 55 and about 85 pounds per square inch is employed both for the formation of foam bubbles and also for urging the foam and hardening agent from the apparatus. It has been discovered that the prior art apparatus is capable of applying a layer of foam having a minimum thickness of about two inches on a substrate. When thus applied, such a layer of foam is capable of preventing the escape of gases and loose paper as well as performing the other desirable functions of a compacted layer of topsoil. However, a two-inch layer of a typical foam which is delivered at a rate of about two to two and a half cubic feet per minute, although effective, does not have the type of economic advantage over compacted topsoil that the applicant wishes to obtain. In addition, foam produced in the manner of the prior art hereinabove described tends, to form a layer upon the substrate garbage rather than penetrating into and filling crevices.

In addition to the preceding, a maximum delivery rate of two to two and a half cubic feet per minute limits the application rate of a two-inch layer of foam by one person to about 12 or 15 square feet per minute. Thus to cover and seal a typical waste dump area of 4,000 feet would take between 4.5 and 5.5 hours for one man.

According to U.S. Pat. No. 4,421,788, there was provided an apparatus for coating a substrate with a hardenable foam containing bubbles of gas, a nozzle including an opening, means for delivering the foam under pressure of the gas to the nozzle, with the opening providing a constriction to flow of the foam therethrough, and pressure of the gas effective to expel the foam from the opening at high- speed to adhere to the substrate.

The pressure of air from the air source was in excess of 100 psi to about 160 psi and preferably about 125 psi. With such pressures, foam exits the nozzle at a high enough velocity so as to adhere to the substrate. The nozzle was preferably flattened at its end to form a slit to emit a fan-shaped spray. The foam filled into irregularities in the substrate including flexible portion of the substrate such as paper. On smooth areas of the substrate, an effective layer as thin as $\frac{1}{4}$ inch was feasible.

The nozzle could be mounted on a mobile platform such as a tractor or trailer carrying the foam-generating apparatus to seal and cover the waste more economically than a workman on foot.

In the prior art the waste could be covered up to about 95 percent, there tended to be mottling, gaps, gaps from tractor treads, some gaps in the spraying pattern or gaps between the impression of compactor wheels or rollers. It was difficult to thoroughly cover large or projecting pieces of waste which oftentimes projected even when the waste had been compacted. Further multiple wheeled compactors tended to raise projections of large objects which may have been already compacted by other wheels.

According to the present invention, an apparatus and method is provided that enables less foam to cover waste more thoroughly. Well over 95 to 100 percent of the waste is covered and sealed. There is a 50 to 100 percent reduction of the gap in the plastic layer. The improvement is obtained using less resin and curing agent, in less time and with a lower labor cost.

The present invention provides an improved apparatus for covering and sealing dumped waste with a hardenable plastic layer which adheres to the substrate. The waste is sprayed by a series of nozzles angulated to spray a swath greater than the width of the compacting roller and wheel combination as the waste is compacted. The roller and wheel combination is wider than the tracks of the pulling tractor thus there is no disruption to the compacted surface which is sprayed from nozzles angulated to cover all sides of any projections.

The apparatus of the present invention is for the spraying of hardenable plastic foam for the covering and sealing of dumped waste. It includes a compacting wheel, adapted to be tracked over dumped waste, the compacting wheel is wider than the tracks of the tractor, tracking the wheel, the hardenable foam generating means, yoke means, and nozzles extending from the yoke means. The nozzles alternatingly extend downwardly on the yoke means at an angle away from a vertical plane and juxtaposed to said compacting wheel. The hardenable plastic foam generator delivers the foam at high velocity to the nozzles so that the foam adheres to the waste. The nozzles spray a swath at least the width of the compacting wheel over waste as it is compacted. The wheel may depend from a support bed and the foam generating means and yoke may be supported by the bed. Preferably the nozzles are at angles of between 30 and 70 degrees from the vertical and the foam is generated at pressures between 100 to 160 pounds per square inch and is emitted from said nozzles in a fan shaped swath.

A method is also provided for covering and sealing dumped waste by tracking the apparatus with a tractor vehicle. Foam is preferably generated at 125 pounds per square inch.

The principal object of this invention is to provide an apparatus for applying a foam layer to cover and seal dumped waste, which is unique in design, as compared to the prior art, beacuse the apparatus applies a layer of plastic foam on the surface of more evenly compacted waste, substantially more economically and faster, with fewer voids and less mottling than was heretofore possible.

Another object of this invention is to provide an apparatus and method for applying a foam layer to cover waste, which excels in performance, in compliance with federal, state, and municipal codes, which govern the disposal of solid wastes.

Another object of this invention is to be provide an apparatus and method for applying a foam layer to cover the seal dumped waste, which will employ two rows of nozzles for spraying, each being oppositely opposed to each other, and angled, so as to spray foam at angles of from thirty to seventy degrees from a vertical plane, thus coating any projections of the waste materials, that may result, after the flattening by the roller and wheel combination means.

A still further object of this invention is to provide an apparatus and method for applying a foam layer to cover and seal dumped waste, which is of such design, that the roller and wheel combination is elongated, so as to extend beyond the width of the tractor, which pulls it while foam is simultaneously sprayed, so as to overcome the disadvantages of the prior art, which compacted the waste unevenly because the center wheel thereof was spaced in such a manner between its rear wheels, that a gap existed on each side of the center wheel, leaving an area of the cover waste uncompacted. In the prior art the spraying and compacting were oftentimes not simultaneously done.

An even further object of this invention is to provide an apparatus and method for applying a foam layer to cover and seal dumped waste, which will employ a chemical curing accelerator for quickly hardening the blanket of plastic foam, after it has been sprayed from the apparatus.

Other objects of the invention are to provide an apparatus and method for applying a foam layer to cover waste, which will be simple in design, inexpensive to manufacture, rugged in construction, and safe in operation.

Although such novel feature or features believed to be characteristic of the invention are pointed out in the claims, the invention and the manner in which it may be carried out, may be further understood by reference to the description following and the accompanying drawings.

Referring now to the figures in greater detail, where like reference numbers denote like parts in the various figures.

Figure 2:
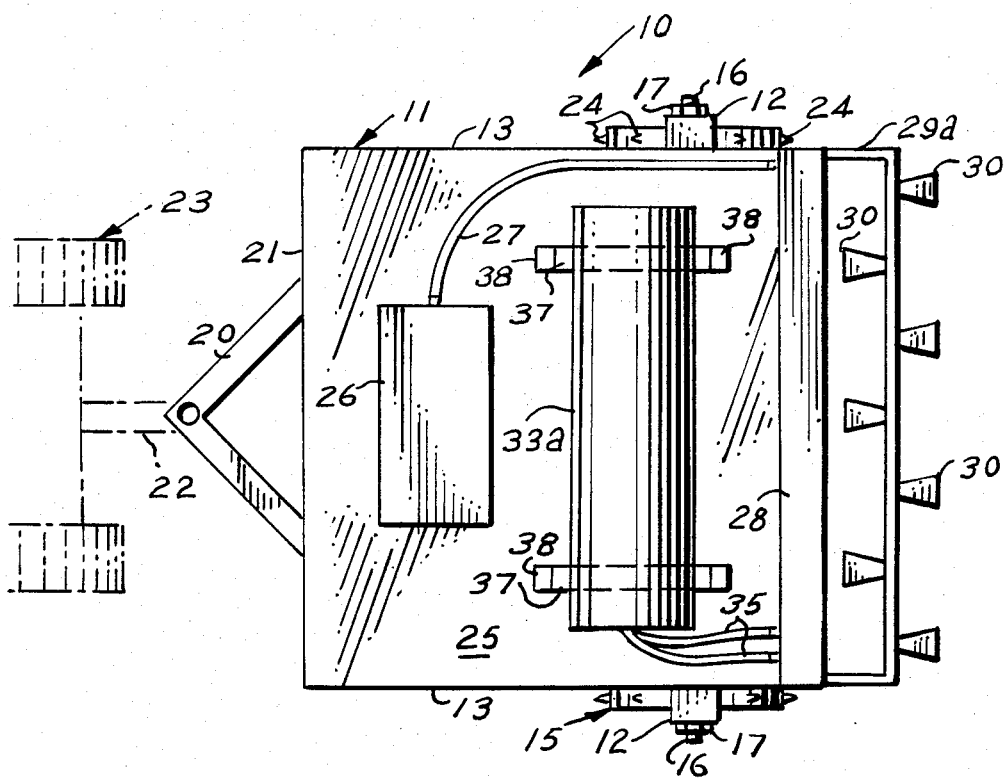

FIG. 1 is a side view of the present invention, shown in operative use, and partly in section, with the sprayed foam layer illustrated in phantom, as is the tractor, which is shown fragmentarily, and FIG. 2 is an enlarged top plan view of FIG. 1.

Accordingly, an apparatus 10 is shown to include a bed 11 of rectangular configuration, having a mounting member 12 fixedly secured to its side edges 13, in a suitable manner, not shown. Mounting members 12, are positioned near the rear end 14 of bed 11, and serve as yoke means for roller and wheel combination 15, which is rotatably received upon axle 16. Axle 16 is rendered secured in members 12, by suitable means such as the nut fasteners 17, and combination 15 provides support for bed 11, and also provides a means of compacting the waste 18, which has been previously spread on a waste dump site 19. A bar 20, common in the art, is fixedly secured to the forward end 21 of bed 11, so as to receive the hitch 22 of a tractor 23, which serves to pull apparatus 10. The roller and wheel combination 15 includes a plurality of rows of equally spaced-apart pointed spikes 24, which are fixedly secured thereto, in a manner, not shown, and it is to be noted, that the ends of the roller and wheel combination 15, extends beyond side edges 13 of bed 11, and the width of the tractor 23, so as to provide a wider cover waste 18, for substantial even surfacing thereof. Thus the area of the tread of the tractor 23 is always smoothed over by the roller and wheel combination 15. On the top surface 25 of bed 11, an air compressor 26 is suitably mounted, in an manner not shown, and a flexible air hose 27 is coupled at one end, to compressor 26, and is suitably coupled at its opposite to a mixing chamber 28. Mixing chamber 28 is suitably secured to the top of a mounting bracket 29, which is fixedly secured at its bottom end to the top surface 25 of bed 11 at its rear end 14. A pipe 29a is fixedly secured in a suitable manner to the bottom portion of mixing chamber 28, and is terminated at its lower end, by two rows or banks of spray nozzles 30, which are fastened thereto, in the manner known in the art. Each row of nozzles 30, are oppositely opposed to each other for effective spraying of the foam 32, to produce layer 32 on the cover waste 28. The degree of angle of each of the oppositely opposed nozzles 30, is thirty to seventy degrees, with respect to the vertical axis of pipe 29, so as to effectively cover the front and rear portions of any projecting cover waste encountered when tractor 23 pulls apparatus 10 along the waste dump site 19.

A pair of reservoir tanks 33 and 33a are provided, which supply the necessary chemicals 34, which are used to produce foam 31 for the layer 32, and a pair of flexible hoses 35 are provided, each being suitable coupled to their respective tanks 33, and 33a. The opposite ends of the hoses 35 are suitably coupled to mixing chamber 28, to feed nozzles 30 by compressed air means, provided by compressor 26. The lower tank 33, is removably received in a pair of arcuately figurated brackets 36, which are fixedly secured to the top surface 25 of bed 11, in a suitable manner, not shown, and a second pair of arcuately configured brackets 37, removably receive the upper tank 33a, and are fixedly secured in a suitable manner, to the tops of a plurality of posts 38. the posts 38 are fixedly secured to surface 25 of bed 11, in a suitable manner, not shown.

In operation, the filled tanks 33 and 33a are placed on the retaining brackets 36 and 37, and their respective hoses 35 are coupled thereto, and coupled to mixing chamber 28. The tractor 23 is then driven forward by the driver, with the compressor turned on to supply air under pressure to the mixing chamber 28. When the above-mentioned occurs the compressed air causes the chemicals 34 to mix in chamber 28, which are forced out of the nozzles 30, as a plastic foam 31, forming the foam layer 32 on the cover waste 18. As tractor 23 pulls bed 11, the roller and wheel combination 15, compacts the cover waste 18, prior to the foam 31 spraying which forms the foam layer 32.

The width of the roller and wheel combination 15 being wider than that of the tractor's 23 threads, assures that the waste 18 will be compacted evenly and completely without any disruption to the layer 32. The foam 31 from the nozzles 30 is angled to spray over any projections from the surface of the waste 18 as the waste 18 is passed over by the roller and wheel combination 15, to get one side of any projection and as the second set of nozzles 30 pass over the waste 18 any other uncovered part of the waste 18 is again sprayed and covered.

EXAMPLE

The usual drum set of resin and curing agent, 50 gallons of resin and 45 gallons of foaming agent, to spray 3000 square feet of waste at 60 feet per minute, using an 8 foot swath of spray from nozzles on a yoke to leave a layer one inch thick was employed with the apparatus of the present invention. Under the same conditions of the prior art, of wind, temperature and air pressure in the foam generator, to spray 3000 square feet, it was found that 3300 square feet were sprayed with a layer of plastic foam, less than one inch thick, at 66 feet per minute. The sprayed waste was covered more thanf 97 percent with little or no mottling of the surface. There was a reduction of the gaps in the plastic foam layer over the prior art of approximately 50 percent.

The terms and expressions which are employed are used as terms of description; it is recognized, though, thta various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. Apparatus for the spraying of hardenable plastic foam for the covering and sealing of dumped waste comprising a compacting wheel, said compacting wheel adapted to be tracked over dumped waste, said compacting wheel wider than the tracks of a tractor vehicle adapted to track said wheel, hardenable foam generating means, yoke means, a plurality of nozzles extending from said yoke means, said foam generating means and yoke means and said nozzles adapted to track with said wheel, said nozzles alternatingly extending downwardly on said yoke means at an angle away from a vertical plane and juxtaposed to said compacting wheel, said hardenable plastic foam generating means adapted to deliver said foam at high velocity to said nozzles to adhere to said waste, and said nozzles adapted to spray a swath at least the width of said compacting wheel over waste computed by said wheel.

2. The apparatus of claim 1 wherein said wheel depends from a support bed.

3. The apparatus of claim 1 or 2 wherein said foam generating means and yoke means are supported by said bed.

4. The apparatus of claim 1, 2 or 3 wherein said nozzles are at angles of between 30 and 70 degrees from the vertical.

5. The apparatus of claim 4 wherein said nozzles are at an angle of 30 degrees from the vertical.

6. The apparatus of claim 4 wherein said nozzles are at an angle of 70 degrees from the vertical.

7. The apparatus of claim 1, 2, 3 or 4 wherein said foam is generated at pressures between 100 to 160 pounds per square inch.

8. The apparatus of claim 7 wherein said foam is generated at 100 pounds per square inch.

9. The apparatus of claim 7 wherein said foam is generated at 125 pounds per square inch.

10. The apparatus of claim 1, 2, 3, 4, or 7 wherein said foam is emitted from said nozzles in a fan shaped swath.

* * * * *

UNITED STATES PATENT AND TRADEMARK OFFICE
CERTIFICATE OF CORRECTION

PATENT NO. : 4,519,338
DATED : May 28, 1985
INVENTOR(S) : Fritz Kramer, et al.

It is certified that error appears in the above-identified patent and that said Letters Patent is hereby corrected as shown below:

Claim 1, line 21, change "computed" to -- compacted --

Signed and Sealed this

Fifteenth Day of September, 1987

Attest:

DONALD J. QUIGG

Attesting Officer

Commissioner of Patents and Trademarks